United States Patent

[11] 3,574,895

| [72] | Inventor | Donald B. McIlvin |
| | | Danvers, Mass. |
| [21] | Appl. No. | 692,926 |
| [22] | Filed | Dec. 22, 1967 |
| [45] | Patented | Apr. 13, 1971 |
| [73] | Assignee | USM Corporation |
| | | Flemington, N.J. |

[54] FOOTWEAR SOLE-INJECTION-MOLDING APPARATUS
8 Claims, 9 Drawing Figs.

[52] U.S. Cl. .................................................. 18/30,
 18/42
[51] Int. Cl. ................................................. B29f 1/00
[50] Field of Search .......................................... 18/30 (US),
 34 (S), 36, 42 (H), 17 (S)

[56] References Cited
 UNITED STATES PATENTS
3,305,895 2/1967 Ludwig .......................... 18/42X
3,374,504 3/1968 Ludwig .......................... 18/30
3,425,094 2/1969 Ludwig .......................... 18/30

Primary Examiner—H. A. Kilby, Jr.
Attorneys—W. Bigelow Hall, Richard A. Wise and Scott R. Foster ABSTRACT: Apparatus for injection molding onto a lasted footwear upper a sole having different compounds or colors of plastics. The apparatus comprises a footform for receiving a lasted upper, a mold ring for defining the periphery of the molded sole, and a bottom mold member for defining the bottom of the molded sole. The mold ring is provided with at least one injection passage for the entrance of a first plastic into the mold cavity formed by the footform, mold ring and bottom mold member. The bottom mold member is provided with an injection passage for the entrance of a second plastic. A mold member is further provided with means to segregate the mold cavity zones into which the first and second plastics are injected.

Patented April 13, 1971

Inventor
Donald B. McIlvin
By his Attorney

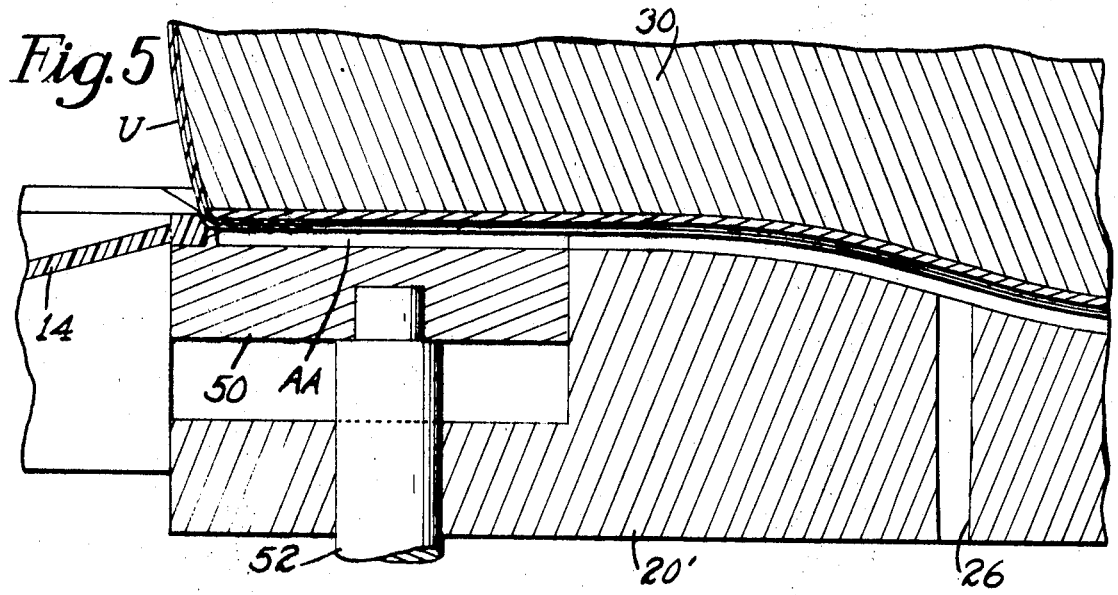
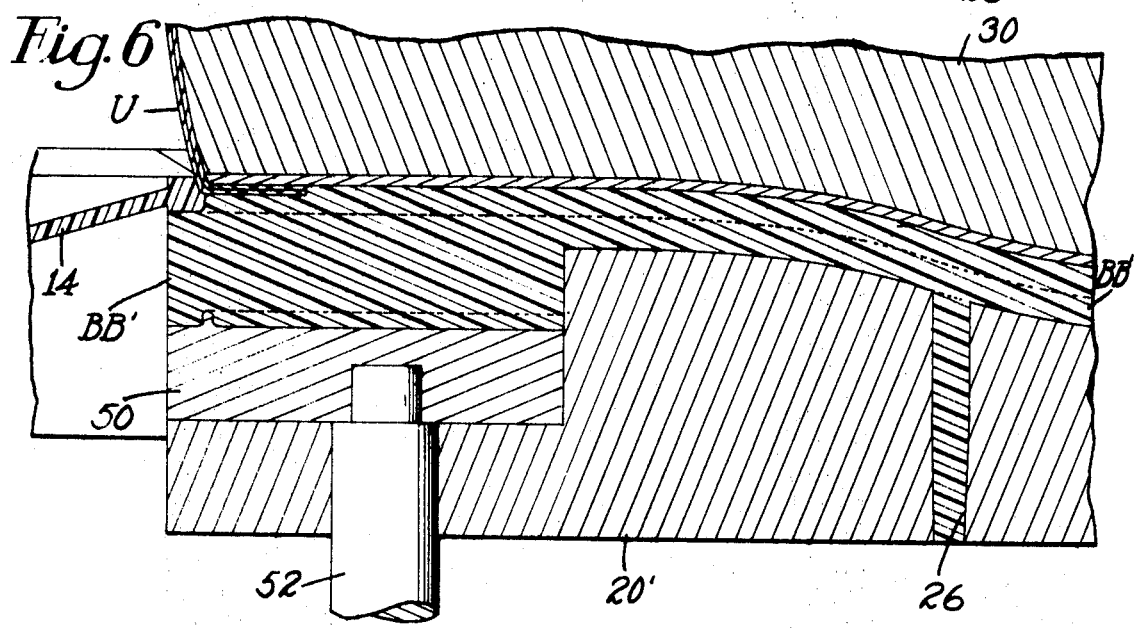
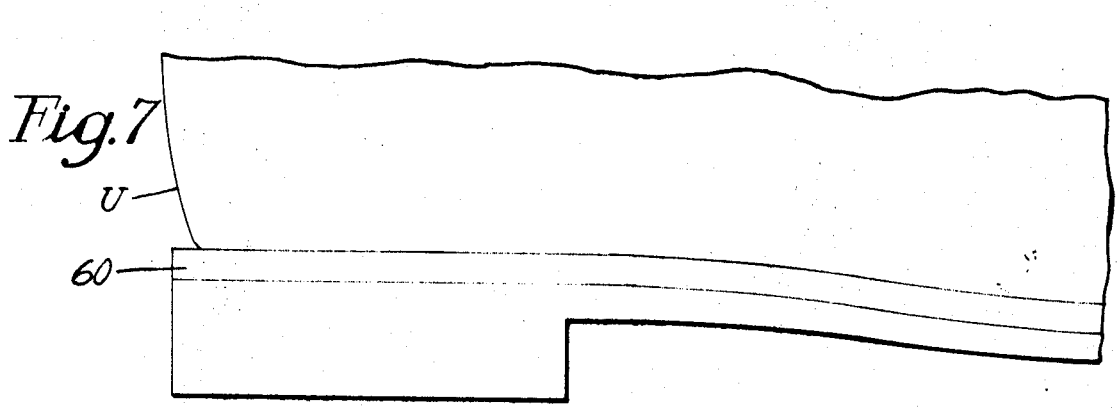

FOOTWEAR SOLE-INJECTION-MOLDING APPARATUS

BACKGROUND OF THE INVENTION

1. Field of the Invention

This invention relates to apparatus for injection molding of soles onto lasted footwear uppers and is directed more particularly to such apparatus having facility for molding soles of different kinds or colors of plastics or other injection-molding material.

2. Description Of The Prior Art

In the molding of soles of two different kinds or colors of plastics, it has proven difficult to maintain separate injection passageways free of undesirable molding material. When the first material injected into the sole cavity enters the second material injection passage it hinders orderly flow of the second material or causes discoloration where the two materials are of different colors. The usual solutions to such problems involve the provision of valves for the injection inlets or a system of passageways in the mold ring and bottom mold member which interconnect at various stages of movement of the bottom mold member in such a manner that when one passage, or set of passages, is open the other passage, or set of passages, is closed.

The provision of injection port valves has presented some operational problems such as valve sticking, failure to open and/or close properly or completely, and the like. The arrangement of injection passageways in the prior art has presented certain manufacturing problems in view of the complexity of the bores required in the mold members, the mold members being rather expensive components to begin with.

SUMMARY OF THE INVENTION

It is an object of the present invention to provide improved apparatus for injection molding soles of two plastics onto lasted uppers.

It is a further object of the invention to provide such apparatus in which the first injection-molding material does not come in contact with the second injection material inlet and the second injection-molding material does not come in contact with the first injection material inlet.

A still further object of the invention is to provide such apparatus in which the injection inlets are relatively easily machined, and with a large tolerance for error, so as to minimized mold rejects and reduce the overall costs of such apparatus.

With the above and other objects in view, as will hereinafter appear, the present invention in one aspect thereof contemplates the provision in a machine of the type above referred to of an upstanding barrier or wall disposed in the mold cavity to divide the mold cavity into two zones, a first zone on the outside of the barrier and a second zone within the barrier. Means are provided for injecting a first material into the first zone and thereafter for injecting a second material into the second zone, the second injection operating to move the bottom mold member to a second position.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

FIG. 5 is a lengthwise sectional view of the mold assembly according to the second embodiment and showing a movable heel portion of the bottom mold member;

FIG. 6 is similar to FIG. 5, but shows the heel portion in a second position;

FIG. 7 is a side elevational view of the finished product of the apparatus of the second embodiment.

DESCRIPTION OF THE PREFERRED EMBODIMENTS

Figure 1:
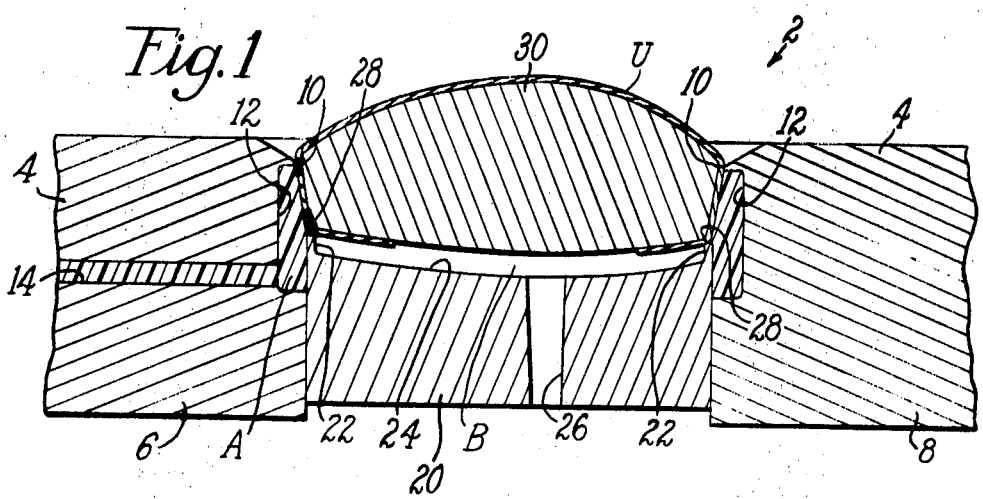
FIG. 1 is a sectional view of one form of apparatus illustrative of an embodiment of the invention, the section being taken widthwise of a footwear footform, this view showing the apparatus as it is disposed for a first injection and commencement of a second injection.

Referring to FIG. 1, it may be seen that the illustrative apparatus includes a mold assembly 2 having a mold ring 4 which may comprise side mold members 6,8. The side mold members 6,8 are each provided with a lip 10 and a recess 12, the underside of the lips 10 and the recesses 12 defining mold cavity surfaces. At least one of the side mold members is provided with at least one injection inlet 14 which interconnects a source of molten injection-molding material (not shown), hereinafter referred to as first injection material, and the recesses 12.

The mold assembly 2 includes a bottom mold member 20 having an upstanding wall or barrier 22 about its periphery and disposed on its mold cavity surface 24. At least one second injection inlet 26 is disposed in the bottom mold member 20 and interconnects a source of molten injection-molding material (not shown), and the space in the mold cavity adjacent the surface 24. Means (not shown) are provided for moving the bottom mold member in directions into and out of the cavity formed by the side mold ring.

To complete the mold assembly 2, there is provided a top mold member comprising a footform 30 which receives a lasted upper U to which a sole is to be molded. Means (not shown) are provided for moving the top mold member toward and away from the remainder of the mold assembly. The footform 30 is movable to a position in which the upper U engages the lips 10 of the side mold ring 4 to enclose a mold cavity, as shown in FIG. 1. It will be noted that an edge 28 of the barrier 22 engages the upper U when the bottom mold member 20 is in the position shown in FIG. 1, which position will hereinafter be referred to as the bottom mold member first position.

With the bottom mold member 20 in the first position, the barrier 22 divides the mold cavity into segregated zones. A first zone A is defined by the lip 10, the recess 12, the upper U, and the bottom mold member 20 and the barrier 22. The first zone A is in communication with the source of first injection material by way of the first injection inlet 14. A second mold cavity zone B is defined by the footform and the upper, and the bottom mold member and the barrier. The second zone B is in communication with the source of second injection material by way of the second injection inlet 26.

The mold assembly 2, as shown in FIG. 1, is in condition for commencement of the sole-molding operation. In operation, the first molding material is forced through the inlet 14, by plasticator means not shown but well known in the art, and into the first zone A of the mold cavity. Zone A may be provided with telltale means (not shown) which, upon filling of zone A, signals the first plasticator means to terminate injection.

By simple switching means (not shown) upon termination of operation of the first plasticator means, or after a suitable time delay, a second plasticator means (not shown) commences forcing the second injection material through the second inlet 26 and into the second zone B of the mold cavity. After the second zone B is filled with second injection material, the second plasticator continues to force material through the inlet 26.

Figure 2:
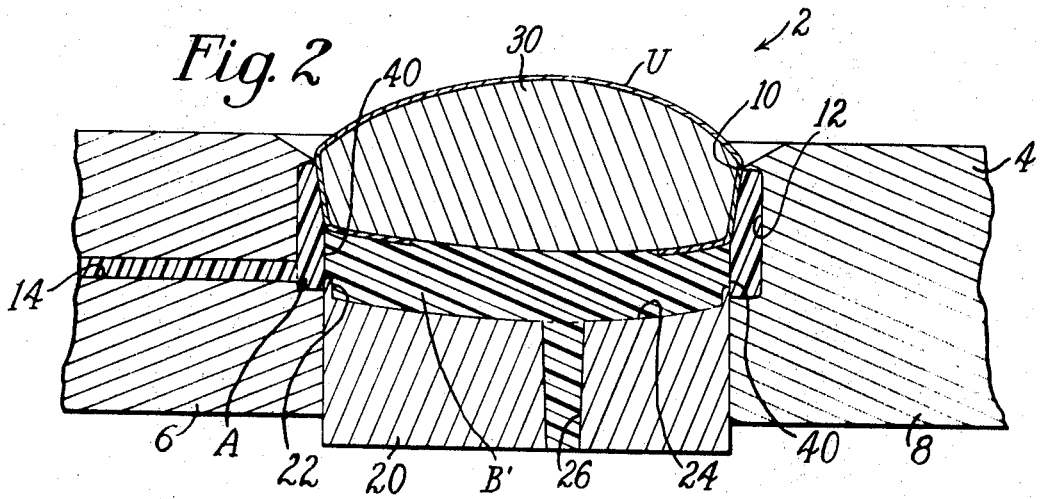
FIG. 2 is similar to FIG. 1, but shows the apparatus as it is disposed after completion of the second injection.

The increasing pressure in the second mold cavity zone B causes the bottom mold member 20 to move in a direction away from the footform 30, or downwardly as viewed in FIGS. 1 and 2. Referring to FIG. 2, it will be seen that the bottom mold member 20 is movable by the pressure of the second injection material to a second position which defines an enlarged second zone B' bounded by the bottom mold member and the barrier, the footform and the upper, and the first injection material previously injected into the first zone A and subsequently solidified. The degree of solidification of the first injection material depends upon the compound used, the delay between the first and second injection operations and the use of forced cooling means. However, because the juncture 40 of the two materials is hidden, i.e., not exposed to view in the final product, it is not necessary that the first material be completely solidified before the second material is introduced to the mold cavity. Limited mixing of the two materials along the juncture is not detrimental to the appearance of the molded sole.

The extent to which the bottom mold member is moved by the pressure of the second injection step is limited by a mechanical stop (not shown) which operates to activate a switch which terminates operation of the second plasticator means.

The above-described embodiment of the invention facilitates the molding of a sole having an outer band of one type or color of plastic and a tread portion of another type or color of plastic. Although the term "plastic" is used herein, it is intended to include artificial and natural rubbers, combinations of plastics and rubbers, and other injection-molding materials which for some purposes may not be technically classified as plastics.

Figure 3:
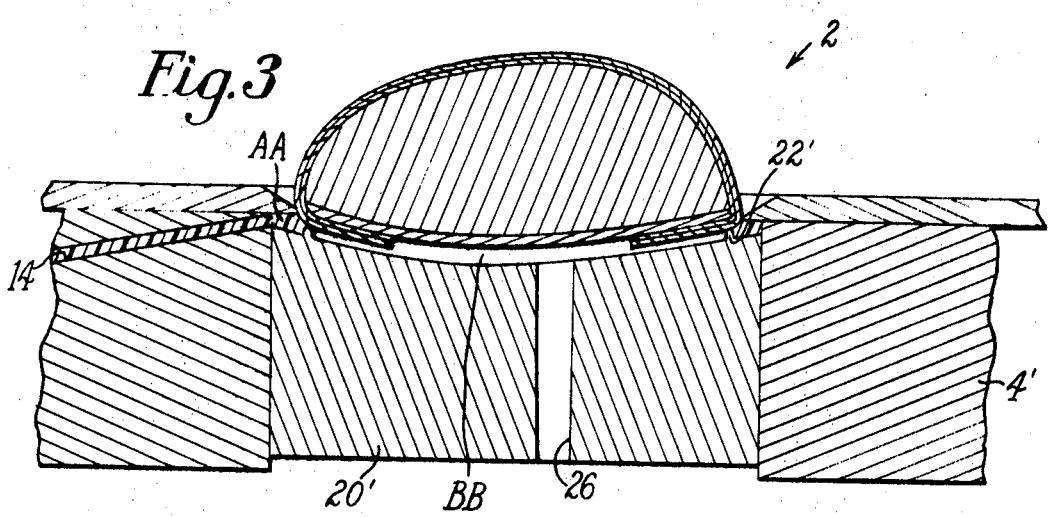
FIG. 3 is similar to FIG. 1, but shows an alternative embodiment.
Figure 4:
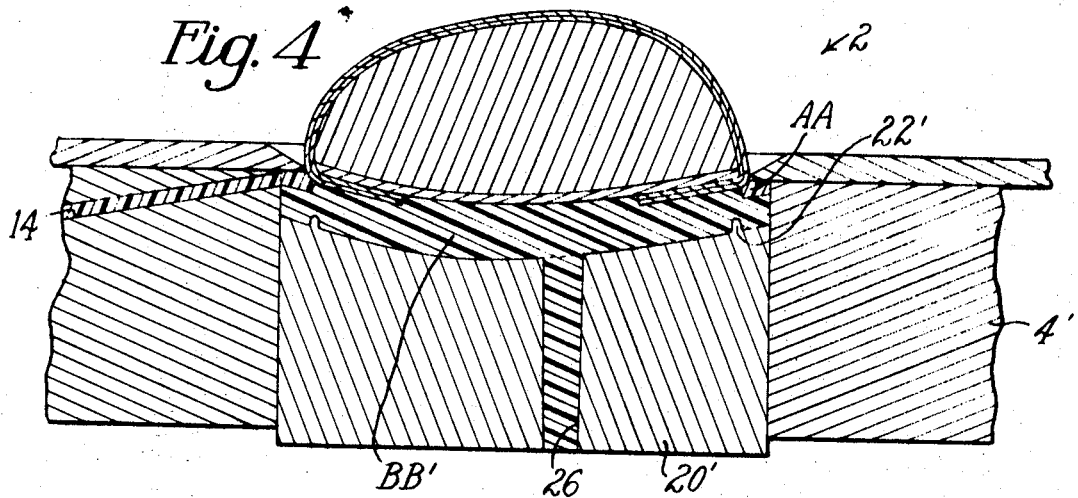
FIG. 4 is similar to FIG. 3, but shows the alternative embodiment as it is disposed after completion of the second injection.

An alternative embodiment of the invention, illustrated in FIGS. 3 and 4, facilitates the injection molding of a sole similar to that described above, but including levels of different materials visible at the edge of the sole.

Referring to FIG. 3, which shows the bottom mold member 20' in the first position, it will be seen that the side mold ring 4' is not provided with recesses corresponding to the recesses 12 of the first embodiment, but is the same width throughout its entire surface as the bottom mold member 20'. The barrier 22' is in this embodiment displaced from the periphery of the bottom mold member.

A first injection is made into the zone AA followed by a second injection into the zone BB. The injection into the zone BB causes movement of the bottom mold member downwardly, as viewed in FIGS. 3 and 4, to enlarge the second zone BB' and until the bottom mold member actuates means for terminating injection. Referring to FIG. 4, it may be seen that the finished sole includes a peripheral band, formed of the first injection material, and a tread portion formed of the second injection material. In this embodiment the tread portion extends the full width of the sole.

FIGS. 5 and 6 show the manner in which the heel of a shoe having a breastline is molded in accordance with the second embodiment. A heel section 50 of the bottom mold member 20' is movable relative to the remainder of the bottom mold member by means (not shown) operative upon a rod 52 connected to the heel section 50. When the bottom mold member is in the first injection position, as shown in FIGS. 3 and 5, the heel section 50 is in a first position shown in FIG. 5, so that the zone AA extends entirely around the upper to produce a welt extension 60 in the final product, as shown in FIG. 7. The location of the injection inlets 14 and 26 are shown for illustrative purposes only and may be placed in the mold ring and bottom mold member as desired.

After commencement of the second injection, and after the zone BB has filled with injected material, the bottom mold member 20' is moved in a direction outwardly from the mold cavity by the pressure of the injected material, as hereinbefore described. The heel section 50, however, is permitted to move through a greater distance than is the remainder of the bottom mold member, to define a heel breast along the juncture of the heel section of the bottom mold member and the remainder of the bottom mold member, as is shown in FIG. 6.

Figure 8:
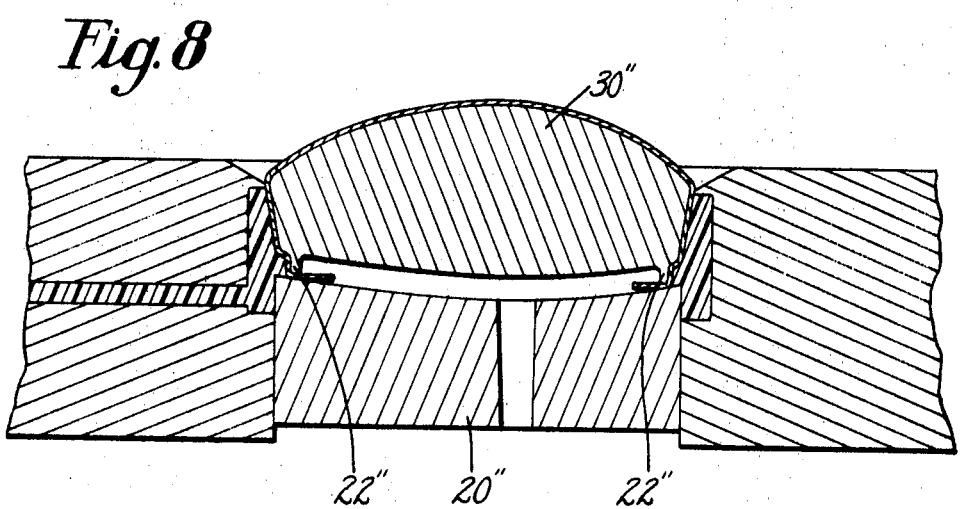
FIGS. 8 and 9 are similar to FIGS. 1 and 2 but show another alternative embodiment.
Figure 9:
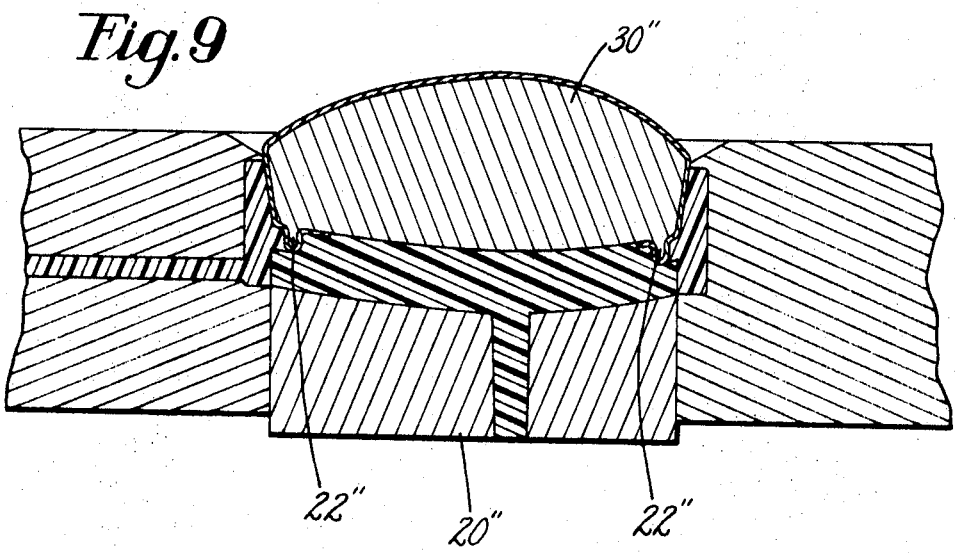

Referring to FIGS. 8 and 9, it will be seen that the barrier 22'' may, if desired, be disposed on the bottom of the footform 30'', whereby to engage, with the upper thereover, the bottom mold member 20''. In this embodiment the barrier serves the same purpose as in the first and second embodiments and the mode of operation is essentially the same, but the location of the barrier permits the molding of a sole not having a groove on the bottom of the sole. In this embodiment the upper may be lasted over the barrier and thereby becomes, for operational purposes, a barrier portion.

Thus, it is seen that according to the present invention soles of two or more different colors or kinds of plastic may be molded onto a lasted footwear upper, each molding stage being conducted within the same mold cavity and in such a manner that a molding material does not engage the injection inlet of another molding material.

I claim:

1. Apparatus for injection molding soles onto lasted footwear uppers, the apparatus comprising a mold ring for defining the sidewalls of a sloe mold cavity, a bottom mold member engageable with said mold ring, a top mold member comprising a footform for mounting a lasted upper, said top mold member being engageable with said mold ring to enclose the mold cavity defined by said mold ring, said top mold member and said bottom mold member, barrier means disposed in said mold cavity between said bottom mold member and said top mold member for dividing said cavity into outer and inner nonconnected zones of free space, said barrier means being relatively narrow and extending about the periphery of said inner zone, and first and second passageways for directing molten material into said outer and inner zones respectively.

2. The invention according to claim 1 in which the material passes through the passageways into the outer and inner zones sequentially.

3. The invention according to claim 2 in which said barrier means is disposed on said bottom mold member, and in which the bottom mold member is movable to a first position in which said barrier means divides said mold cavity into said outer and inner zones, said bottom mold member being responsive to injection into said inner zone to move to a second position whereby to enlarge said inner zone.

4. The invention according to claim 3 in which said barrier means engages said top mold member when the bottom mold member is in the first position in the mold cavity.

5. Apparatus for injection molding a sole in two stages onto a lasted footwear upper, the apparatus comprising a mold ring for defining the sidewalls of a sole mold cavity, a top mold member comprising a footform for mounting the lasted footwear upper, said top mold member being movable toward said mold ring for engagement therewith, a bottom mold member, barrier means disposed on said bottom mold member, said bottom mold member being movable to a position within said mold ring in which said barrier divides said cavity into outer and inner nonconnected zones of free space, said barrier means being relatively narrow and extending about the periphery of said inner zone, said mold ring having at least one sprue passage therein interconnecting a first source of molding material and said outer zone, said bottom mold member having at least one sprue passage therein interconnecting a second source of molding material and said inner zone.

6. Apparatus for injection molding a sole onto a lasted footwear upper, said apparatus comprising a mold ring for defining the edge of the molded sole, a bottom mold member for defining the bottom of the molded sole, a top mold member comprising a footform for mounting a lasted upper to which the sole is to be molded, said top mold member being movable toward said mold ring whereby to engage said upper with said mold ring and enclose a mold cavity, barrier means mounted on said bottom mold member, said bottom mold member being movable to a first position within said mold ring in which said barrier means divides said mold cavity into outer and inner nonconnected zones, said barrier means being relatively narrow and extending about the periphery of said inner zone, conduit means in said mold ring for injecting a first injection material into said outer zone, and conduit means in said bottom mold member for injecting a second injection material into said inner zone, said second injection material operating to move said bottom mold member to a second position whereby to enlarge said inner zone, the enlarged inner zone being defined in part by the first injection material in the mold cavity.

7. The invention according to claim 2 in which said barrier means is disposed on said top mold member for dividing said mold cavity into said outer and inner zones when said bottom mold member is in a first position and said bottom mold member is responsive to injection into said inner zone to move to a second position whereby to enlarge said inner zone.

8. The invention according to claim 7 in which said barrier means is engageable with said bottom mold member when the bottom mold member is in the first position in the mold cavity.